(12) United States Patent
Ichiryu

(10) Patent No.: US 6,379,117 B1
(45) Date of Patent: Apr. 30, 2002

(54) COOLING AIR SUPPLY SYSTEM FOR A ROTOR

(75) Inventor: Taku Ichiryu, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/642,908

(22) Filed: Aug. 22, 2000

(30) Foreign Application Priority Data

Aug. 23, 1999 (JP) ............................................ 11-235350

(51) Int. Cl.⁷ ............................ B63H 1/14; B64C 11/00; F01D 5/08
(52) U.S. Cl. .................................................... 416/96 R
(58) Field of Search ............................ 415/175; 416/95, 416/96 R, 97 R

(56) References Cited

U.S. PATENT DOCUMENTS

| 3,602,605 A | * | 8/1971 | Lee et al. ..................... 415/116 |
| 4,674,955 A | * | 6/1987 | Howe et al. .............. 415/115 X |
| 4,923,371 A | * | 5/1990 | Ben-Amoz ................. 416/97 R |
| 5,951,250 A | * | 9/1999 | Suenaga et al. .......... 416/96 R |
| 6,234,746 B1 | * | 5/2001 | Schroder et al. ............. 415/115 |

FOREIGN PATENT DOCUMENTS

JP          11-13408          1/1999

* cited by examiner

*Primary Examiner*—John E. Ryznic
(74) *Attorney, Agent, or Firm*—Oblon, Spivak, McClelland, Maier & Neustadt, P.C.

(57) ABSTRACT

In a cooling air supply system for a rotor, cooling air is supplied from cooling air nozzles to an annular cooling air passage formed around the rotor shaft. The cooling air nozzles are formed as straight air passages having circular cross sections. The straight air passages disposed on a stationary annular nozzle member surrounding the rotor shaft. Since the nozzles are formed as straight air passages having circular cross sections, the nozzles can be manufactured accurately at low cost by machining the annular nozzle member. Further, since the freedom for the arrangement of the nozzles increases by using the straight air passages, the nozzles can be arranged in such a manner that cooling air leaving the nozzle flows into the cooling air passage around the rotor shaft without changing its flow direction. Thus, the pressure drop in the cooling air caused by changing flow direction can be largely reduced.

3 Claims, 4 Drawing Sheets

PLANE PERPENDICULAR TO THE AXIS OF THE ROTOR SHAFT

COOLING AIR SUPPLY SYSTEM FOR A ROTOR

BACKGROUND OF THE INVENTION

1. Field of the Invention

The present invention relates to a cooling air supply system used for rotors operating at a high temperature and requiring cooling air.

2. Description of the Related Art

FIG. 5 shows a typical configuration of a cooling air passage used in a gas turbine rotor.

In the machines having rotors operating at a high temperature, such as gas turbines, the rotors are cooled by supplying cooling air thereto. For example, rotor blades of gas turbines which contact a high temperature combustion gas are cooled by supplying cooling air to the cooling air passages formed within the blade in order to increase durability of the blades. Usually, cooling air is supplied to the rotor blade through axial cooling air passages formed in the rotating shaft of the turbine.

In FIG. 5, reference numeral 10 designates a gas turbine rotor as a whole. Rotor 10 includes a rotor shaft 11 and a plurality of turbine disks 13 coupled to the shaft 11 (in FIG. 5, only one turbine disk is shown). Rotor blades 15 for receiving energy of high temperature combustion gas in order to rotate the rotor 10 are embedded on the outer periphery of the disks 13.

As shown in FIG. 5, a cylindrical sleeve 31 is disposed around the outer periphery of the rotor shaft 11. The cylindrical sleeve 31 is attached to the side face of the rotor disk 13 and rotates together with the rotor shaft 11. The cylindrical sleeve 31 has an inner diameter larger than the outer diameter of the shaft 11 and the clearance between the inner surface of the sleeve 31 and the outer surface of the shaft 11 forms an annular cooling air passage 30. An end of the cooling air passage 30 opposite to the turbine disk 13 opens to a cooling air supply chamber 20 and acts as an annular air inlet opening 33.

The cooling air supply chamber 20 is formed in a casing 50 accommodating the rotor 10 as an annular chamber surrounding the open end (i.e., the annular air inlet opening 33) of the sleeve 31. Labyrinth seals 51 and 53 of a known type are disposed on both axial ends of the cooling air supply chamber 20 to prevent cooling air in the chamber 20 from escaping through the clearances between a stationary member (i.e., the casing 50) and a rotating member (i.e., the rotor 11 and the cylindrical sleeve 31).

Cooling air is supplied from a pressurized air source (typically, from the discharge of the air compressor of the gas turbine) to the cooling air supply chamber 20 through a cooling air piping 23. From the cooling air supply chamber 20, cooling air flows into the annular air inlet opening 33 formed around the outer periphery of the shaft 11 and flows through the cooling air passage 30 in the axial direction to the turbine disk 13. At the turbine disk 13, a part of the cooling air is supplied to the root portions of each of the blades 15 through radial air passages 13a disposed in the turbine disks 13. Cooling air supplied to the roots of the blade 15, then, flows through a blade cooling air passage formed within the blades (not shown) to cool the material of the blade 15 and discharged from outlet holes disposed on the leading edges or trailing edges of the blades 15. The remaining portion of cooling air (i.e., cooling air not flowing into the radial cooling air passage 13a) is supplied to other turbine disks (not shown) through an axial passage 13b perforating through the turbine disk 13 in order to cool the rotor blades of other rotors.

When cooling air flows through the cooling air passage 30, a velocity component tangential to the outer periphery of the shaft is given to the flow of cooling air through the contact with the outer surface of the rotor shaft 11 which rotates at a high speed and cooling air in the passage 30 flows in a spiral flow path around the shaft 11 towards the turbine disk 13. This causes a power loss at the rotor shaft 11 by an amount equal to the kinetic energy, corresponding to the tangential velocity component, given to cooling air at the air inlet 33 of the cooling air passage 30.

In order to reduce the power loss at the rotor shaft due to the tangential velocity imparted to cooling air, tangential cooling air nozzles are used in some cases. In the cooling air system equipped with tangential cooling air nozzles, air nozzles injecting cooling air to a direction tangential to the outer peripheral of the rotor shaft are disposed in the casing 50 near the inlet 33 of the cooling air passage 30. Since cooling air is ejected from the tangential air nozzles in the direction tangential to the outer periphery of the shaft 11, the tangential velocity component is imparted to cooling air before it flows into the cooling air passage 30. Therefore, the power loss at the rotor shaft due to the tangential velocity component is largely reduced.

The tangential air nozzles consist of a number of nozzle members having aerofoil cross sections and are disposed radially around the rotor shaft 11 at the air inlet 33 of the cooling air passage 30 and air passages are formed by the clearance between the nozzle members. Usually, the tangential nozzles are formed as expansion nozzles, i.e., the air passages of the nozzles are designed in such a manner that cooling air passing through the nozzles expands in the air passages in the nozzles and is ejected in the tangential direction at a predetermined speed. The pressure difference across the nozzles, i.e., the pressure difference between the pressure of the air in the cooling air supply chamber 20 and the pressure of air at the air inlet 33 of the cooling air passage 30 is determined in such a manner that the magnitude of the velocity of cooling air leaving the nozzles is substantially the same as the peripheral speed of the rotating shaft 11 during the operation of the gas turbine. Since cooling air is ejected from the nozzle in the tangential direction at the speed the same as the peripheral speed of the shaft 11, a difference in the magnitude of the tangential velocity components does not occur when cooling air and the rotor shaft contact each other and power loss at the rotor does not occur.

However, problems occur when nozzle members having aerofoil cross sections are used for tangential air nozzles. When the aerofoil type nozzle members are used, the tangential nozzles are formed by assembling separately manufactured nozzle members by disposing the respective nozzle members around the air inlet of the cooling air passage and securing them to the stationary members in the cooling air supply chamber by welding or brazing. Alternatively, all the tangential nozzles may be made of a one-piece annular member including the aerofoil nozzle members arranged radially therein and may be formed by casting or by machining an annular shaped material by, for example, an electric discharge method.

However, since the shape of the aerofoil nozzle members and the arrangement thereof is complicated, manufacturing and assembly of the tangential nozzles requires many man-hours and, therefore, is costly. Further, when welding or brazing are used for assembling the nozzles, distortion of the nozzle members due o the high temperature used during the assembly may occur. This causes inaccuracy of the direction of cooling air ejected from the nozzles.

Further, if the aerofoil type nozzle members are used, it is necessary to arrange the respective nozzle members in a direction tangential to the outer periphery of the shaft, i.e., the respective nozzle members must be arranged around the outer periphery of the shaft in such a manner that each of the nozzle members is arranged on a plane perpendicular to the axis of the shaft and inclines at a predetermined angle with respect to a radius of the shaft. When the outlets of the nozzles are located in proximity of the outer periphery of the shaft the inclination of the nozzle members becomes larger and, therefore, the manufacturing and assembling of the tangential nozzles becomes more difficult.

In the tangential air nozzles explained above, cooling air is ejected from the nozzles only in the tangential direction. In other words, cooling air ejected from the nozzles does not have an axial velocity component (i.e., a velocity component in the direction parallel to the axis of the shaft). However, cooling air ejected from the nozzles flows in the cooling air passage in the axial direction. Therefore, cooling air ejected from the nozzles must change its flow direction toward the axial direction when it flows into the cooling air passage. This change in the flow direction causes a pressure drop in the flow of cooling air. Therefore, when the tangential air nozzles are used, the pressure of the air in the cooling air supply chamber must be increased in order to obtain a required amount of cooling air flow. As explained before, since cooling air is supplied from the gas turbine air compressor, if the cooling air supply pressure is increased, the power loss in the gas turbine as a whole increases due to an increase in the power consumption of the air compressor.

Theoretically, it is possible to reduce the power loss caused by the change in the cooling air flow direction by imparting an axial velocity component, in addition to the tangential velocity component, to cooling air ejected from the tangential nozzles. However, in order to impart the axial velocity component to cooling air, the nozzles must be inclined to axial direction in addition to the tangential direction. When the aerofoil type nozzle members are used for the air nozzles, it is extremely difficult to incline the nozzles to the tangential direction and to the axial direction simultaneously.

SUMMARY OF THE INVENTION

In view of the problems as set forth above, the objects of the present invention is to provide a cooling air supply system for a rotor in which the air nozzles can be manufactured at low cost and with a high accuracy while avoiding the pressure loss in the cooling air due to a change in the flow direction.

One or more of the objects as set forth above are achieved by a cooling air supply system for a rotor, according to the present invention, comprising a cooling air passage disposed in a rotor shaft and extending in a direction along the axis of the shaft, the cooling air passage being provided with an air inlet opening disposed around the outer periphery of the shaft, an annular cooling air supply chamber surrounding the shaft at the portion the air inlet opening is located, the cooling air supply chamber being connected to a pressurized air source, a plurality of cooling air nozzles for injecting cooling air in the cooling air supply chamber into the air inlet opening of the cooling air passage, wherein the cooling air nozzles are formed as straight passages having circular cross sections and having air outles and inlets thereof opening near the air inlet of the cooling air passage and to the cooling air supply chamber, respectively, the straight passages are formed as through holes perforating a stationary annular member surrounding the periphery of the rotor shaft.

According to the present invention, the cooling air nozzles are formed as a plurality of straight air passages having circular cross sections perforated through the annular stationary member. Therefore, the cooling air nozzles can be easily manufactured at low cost, for example, by drilling through holes in the stationary member. Further, since the cooling air nozzles can be formed by drilling, high accuracy of the dimensions and directions of the cooling air nozzles can be achieved without increasing the manufacturing cost. Thus, according to the present invention, the cooling air nozzles can be manufactured accurately and at low cost.

Further, since the cooling air nozzles are formed as straight air passages perforating through the stationary member, the freedom for the arrangement of the nozzles remarkably increases compared with the case where the aerofoil type nozzle members are used. Therefore, the straight air passages can be easily arranged in such a manner that the straight air passages extend in a direction tangential to the outer periphery of the rotor shaft and, at the same time, incline at an angle from a plane perpendicular to the axis of the rotor shaft. Therefore, the cooling air nozzles can be easily arranged so that cooling air leaving the nozzle has an axial velocity component as well as a tangential velocity component in order to avoid a pressure loss in the cooling air due to the change in the flow direction of the cooling air.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of the cooling air supply system for a rotor according to the present invention will be explained with reference to FIGS. 1 through 4.

Figure 1:
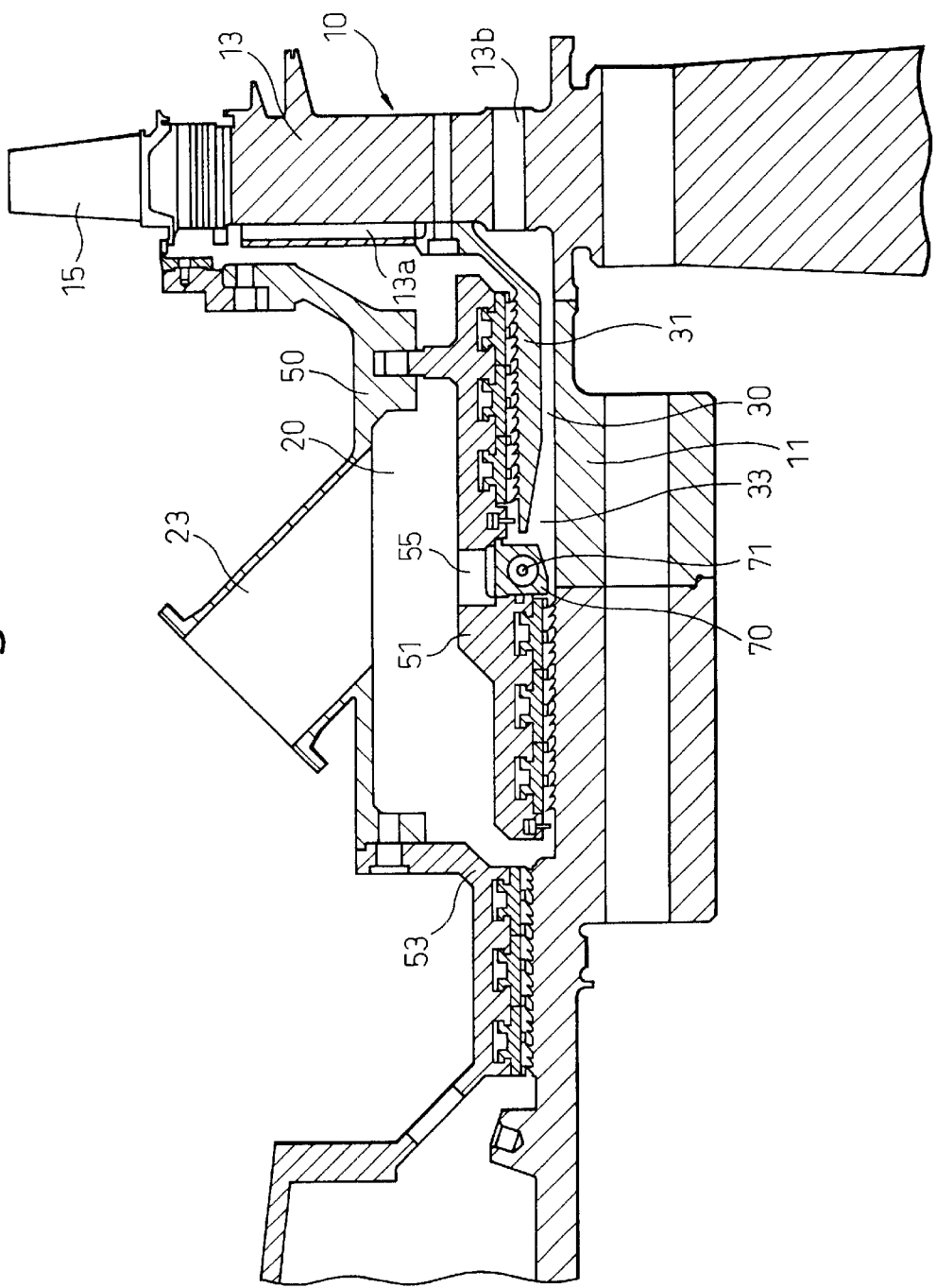
FIG. 1 is a longitudinal section view of a gas turbine rotor showing an embodiment of the present invention applied to a gas turbine.

FIG. 1 shows an embodiment of a cooling air supply system for a rotor applied to a gas turbine rotor. In FIG. 1, reference numerals the same as those in FIG. 5 designate similar elements.

Figure 5:
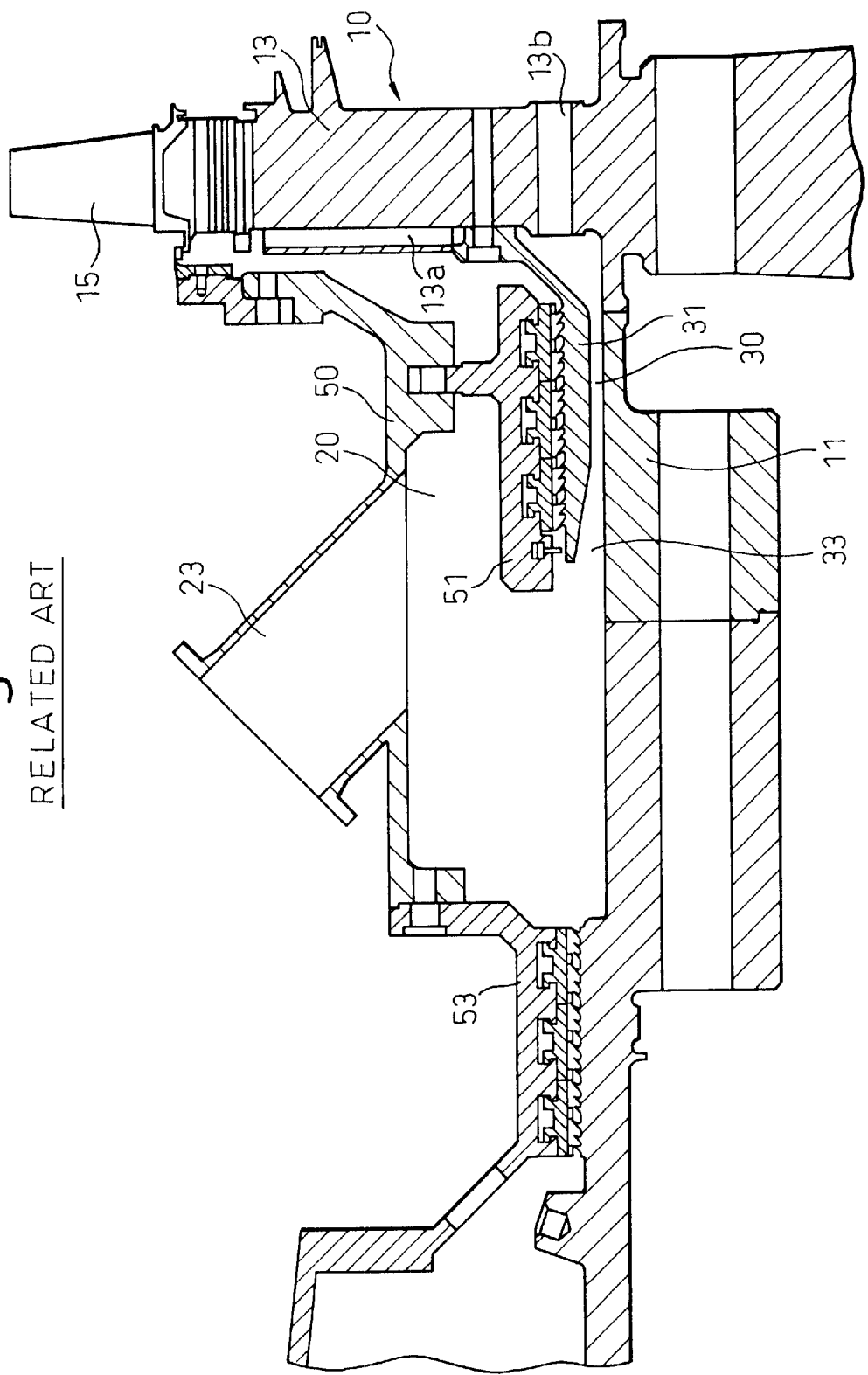
FIG. 5 is a longitudinal section view of a gas turbine rotor showing a cooling air supply system for a rotor in the related art.

In the cooling air supply system in FIG. 1, the cylindrical sleeve 31 is attached to the disk 13 of a gas turbine rotor 10 in the manner similar to that in FIG. 5, and the annular cooling air passage 30 is formed be ween the inner surface of the sleeve 31 and the outer periphery of the rotor shaft 11.

However, the labyrinth seal 51 located on the disk 13 side of the cooling air supply chamber 20 extends beyond the open end (i.e., the annular air inlet) 33 of the cylindrical sleeve 31 into the cooling air supply chamber 20 in order to seal the outer peripheries of the sleeve 31 and the rotor shaft 11. Further, a stationary annular nozzle member 70 surrounding the shaft 11 is fixed on inside of the labyrinth seal 51 near the open end 33 of the sleeve 31. The stationary annular nozzle member 70 is a ring having a rectangular cross section, and a plurality of straight air passages 71 acting as cooling air nozzles are formed at a regular interval in the annular nozzle member 70.

A plurality of openings 55 are provided on the outer periphery of the labyrinth 51 at the portions corresponding to the location of the respective air passages 71. Therefore, since the air inlet 33 of the cooling air passage 30 is isolated from the cooling air supply chamber 20 by the labyrinth seal 51, cooling air in the cooling air supply chamber 20 flows into the air inlet 33 only through the openings 55 of the labyrinth seal 51 and the air passages 71 in this embodiment.

Next, the configuration of the cooling air nozzles (i.e., the straight air passages) 71 will be explained with reference to FIGS. 2 and 3.

Figure 2:
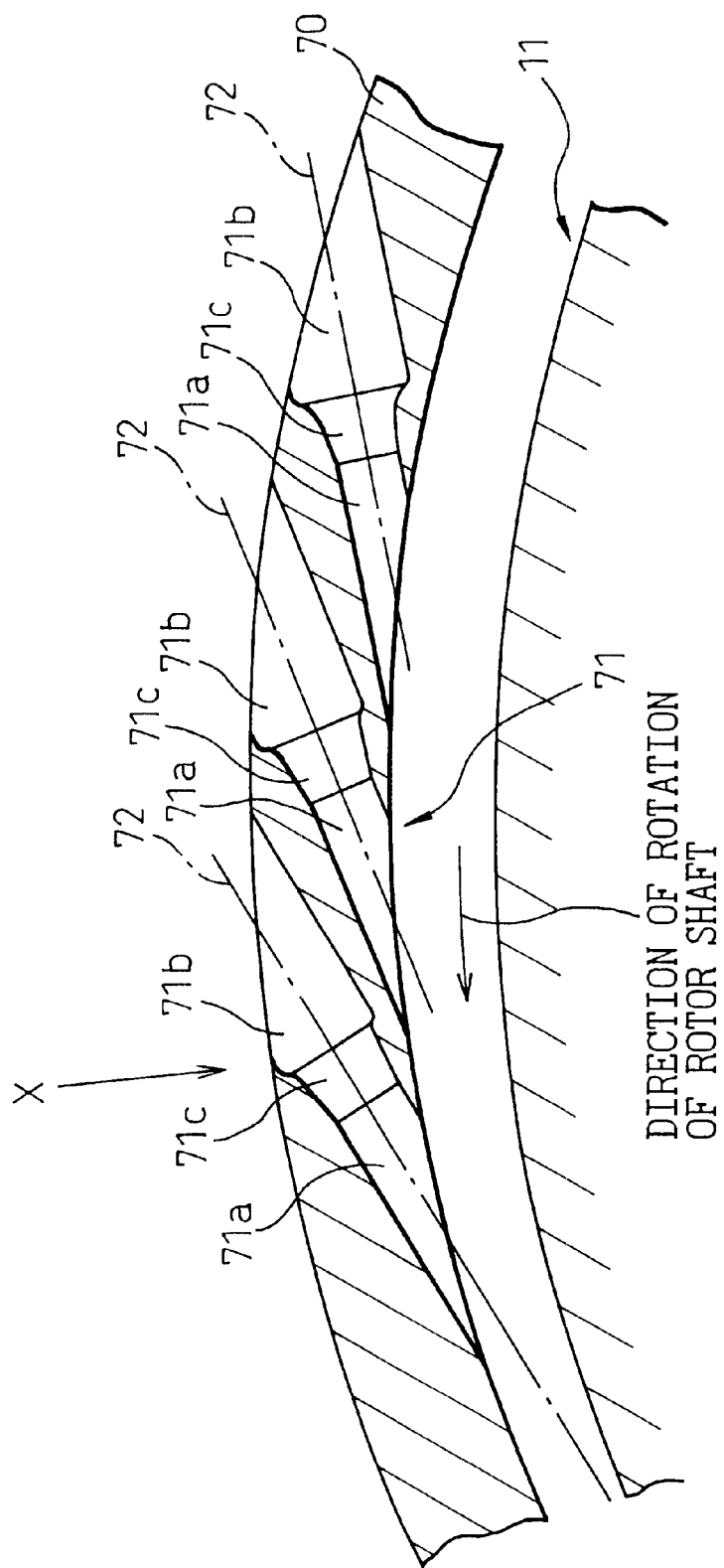
FIG. 2 shows a cross section view taken along plane perpendicular to the axis of the rotor shaft which illustrates an arrangement of the cooling air nozzles.
Figure 3:
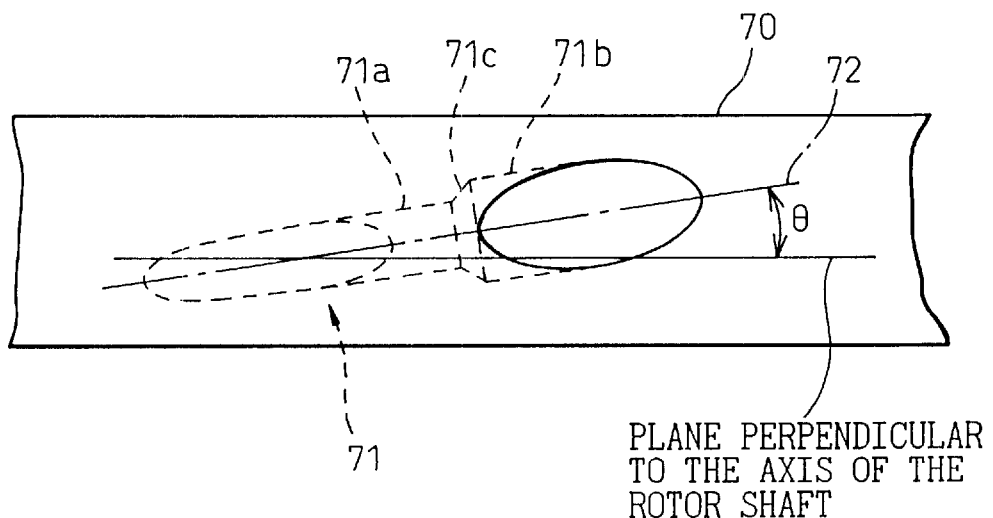
FIG. 3 is a drawing explaining the inclination of the cooling air nozzles to the axial direction.

FIG. 2 is a sectional view of the stationary annular nozzle member 70 taken along a plane perpendicular to the center axis of the rotor shaft 11 and FIG. 3 is a view of the annular nozzle member 71 from the direction indicated by the arrow X in FIG. 2 (i.e., a view in the radial direction of the shaft 11). As shown in FIG. 2, the cooling air nozzles 71 are arranged on the annular nozzle member 70 at a regular interval in the circumferential direction. Each of the cooling air nozzle 71 consists of a nozzle hole 71a, a nozzle inlet hole 71b and a reducer portion 71c, all having circular cross sections. The nozzle hole 71a and the nozzle inlet hole 71b are formed as straight holes and, the nozzle hole 71a opens on the inner periphery of the annular nozzle member 70 while the nozzle inlet hole 71b opens on the outer periphery of the same. The nozzle hole 71a has a diameter smaller than that of the nozzle inlet hole 71b and the reducer portion 71c having a tapered shape smoothly connects the nozzle hole 71a and the nozzle inlet hole 71b.

As shown in FIG. 2, when viewed from the direction along the center axis of the rotor shaft 11, the cooling air nozzles 71 are arranged so that the center axis 72 of each cooling air nozzle 71 extends in a direction tangential to the outer periphery of the rotor shaft 11. In other words, the cooling air nozzles 71 of the present embodiment are formed as tangential cooling air nozzles. However, in this embodiment, the center axis 72 of each cooling air nozzle 71 inclines to axial direction from a plane perpendicular to the center axis of the rotor shaft 11. In other words, as shown in FIG. 3, when viewed from the direction perpendicular to the center axis of the rotor shaft 11, the center axis 72 of the cooling air nozzle 71 in this embodiment inclines toward the turbine disk 13 by an angle θ from the plane perpendicular to the center axis of the rotor shaft 11.

Figure 4:
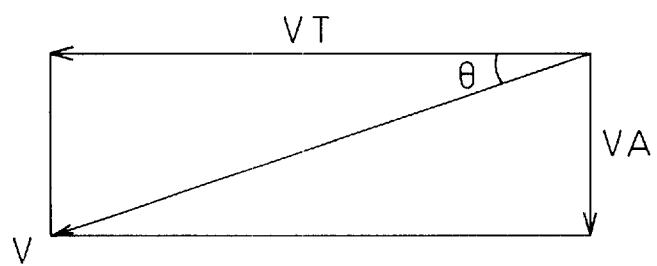
FIG. 4 is a velocity component diagram for cooling air ejected from the cooling air nozzles.

FIG. 4 shows a velocity diagram of cooling air leaving the cooling air nozzles 71 according to the present embodiment. As shown in FIG. 4, due to the inclination angle θ of the center axis 72 of the nozzle 71, when cooling air is discharged from the nozzle 71 at a velocity V, the cooing air has an axial velocity component (i.e., the velocity component parallel to the center axis of the shaft 11) VA as well as the tangential velocity component (i.e., the velocity component in the direction tangential to the outer periphery of the shaft 11) VT. As can be seen from FIG. 4, VA and VT are expressed by VA=V×sin θ and VB=V×cos θ.

In this embodiment, the angle θ and the flow velocity V of cooling air are determined in such a manner that the tangential velocity component VT of cooling air becomes substantially the same as the peripheral speed of the rotor shaft 11 at the revolution speed in the rated operating conditions of the gas turbine, and the axial velocity component VA becomes substantially the same as the velocity of cooling air flowing through the cooling air passage 30 in the axial direction (i.e., the direction parallel to the center axis of the shaft 11) at the rated operating conditions of the gas turbine.

The peripheral speed of the rotor shaft in the rated operating conditions of the gas turbine is given as a design value. Therefore, the tangential velocity component VT is known value. Further, the axial velocity of cooling air flowing through the cooling air passage 30 is determined by the required flow rate of cooling air in the rated operating conditions of the gas turbine. Therefore, the axial velocity component VA is also a known value. Consequently, the velocity of cooling air leaving the nozzle 71, i.e., cooling air injection velocity V is calculated by $V=(VT^2+VA^2)^{1/2}$, and the angle θ of inclination of the nozzle 71 is calculated by $θ=\tan^{-1}(VA/VT)$. Further, the diameters of the nozzle hole 71a and the nozzle inlet hole 71b are determined by a known method using the injection velocity V and required flow rate of cooling air.

As explained above, cooling air leaving the cooling air nozzle 71 in this embodiment has a tangential velocity component equal to the peripheral speed of the rotor shaft 11 and an axial velocity component equal to the axial velocity of cooling air flowing through the cooling air passage 30 in this embodiment. Therefore, cooling air leaving the nozzle 71 flows into the cooling air passage 30 substantially without changing its flow direction. Thus, in this embodiment, the pressure loss in the cooling air caused by the change in the flow direction of the cooling air and the power loss at the rotor shaft caused by imparting a tangential velocity component to the cooling air can be avoided.

Further, the respective cooling air nozzles 71 are formed as straight holes having circular cross sections. Therefore, the cooling air nozzles 71 can be easily formed with high accuracy by machining the stationary annular nozzle member 70, for example, by drilling. By this feature, the cost and man-hours required for manufacturing the cooling air nozzles 71 are remarkably reduced in the present embodiment compared with the case where the conventional aerofoil type nozzle members are used. Further, since welding or brazing are not required for manufacturing the cooling air nozzles 71 in this embodiment, thermal distortion of the nozzles does not occur during the manufacturing process. Thus, the accuracy of the shape and direction of the nozzles is largely increased.

It is true that the pressure drop in the cooling air across the nozzle having a straight air passage such as those in the present embodiment becomes larger compared with the case where the aerofoil type nozzle members are used. However, in the cooling air supply system for a gas turbine rotor, the velocity of cooling air at the outlet of the nozzle is relatively low (for example, 100 to 200 meter/sec), and the pressure ratio of cooling air across the nozzle is also relatively small (for example, less than about 1.2). Therefore, the increase in the pressure drop in the cooling air when the straight air passage nozzles are used is negligibly small. Thus, by using the straight air passage nozzle in this embodiment, the efficiency of the gas turbine as a whole is improved due to a decrease in the pressure drop of cooling air due to the change in the flow direction.

will be understood from the above explanation that the present invention provides a cooling air system for a rotor which is capable of reducing the manufacturing cost and, at the same time, increasing the efficiency of a gas turbine, as a whole.

What is claimed is:

1. A cooling air supply system for a rotor comprising:
    a cooling air passage being disposed in a rotor shaft and extending in a direction along an axis of the rotor shaft, said cooling air passage also being provided with an air inlet opening disposed around an outer periphery of the rotor shaft;
    an annular cooling air supply chamber surrounding the rotor shaft at a portion where the air inlet opening is located, said cooling air supply chamber being connected to a pressurized air source;
    a plurality of cooling air nozzles configured to inject cooling air in the cooling air supply chamber into the air inlet opening of the cooling air passage;
    wherein the cooling air nozzles are formed as straight passages having circular cross sections and also having air outlets and inlets thereof opening near the air inlet opening of the cooling air passage and to the cooling air supply chamber, respectively, said straight passages being formed as through holes perforating a stationary annular member surrounding the outer periphery of the rotor shaft;
    wherein each air passage of the cooling air nozzles extends in a direction tangential to the outer periphery of the rotor shaft and also inclines in an axial direction of the rotor shaft at a predetermined angle with respect to a plane perpendicular to the axis of the rotor shaft; and
    wherein said predetermined angle is determined in such a manner that cooling air ejected from the cooling air nozzle has a velocity component, tangential to the outer periphery of the rotor shaft, substantially the same as a peripheral speed of the rotor shaft and a velocity component parallel to the axis of the rotor shaft substantially the same as the velocity of cooling air flowing through the cooling air passage in the axial direction.

2. A cooling air supply system for a rotor as set forth in claim 1, wherein the straight passages of the cooling air nozzles are formed as drilled holes in the stationary annular member.

3. A cooling air supply system for a rotor as set forth in claim 1, wherein the rotor is a turbine rotor of a gas turbine.

* * * * *